United States Patent
Umemoto (10) Patent No.: US 10,652,656 B2
(45) Date of Patent: May 12, 2020

(54) DIGITAL SIGNAL PROCESSING DEVICE AND AUDIO DEVICE

(71) Applicant: Mitsubishi Electric Corporation, Tokyo (JP)

(72) Inventor: Satoshi Umemoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/478,790

(22) PCT Filed: Mar. 1, 2017

(86) PCT No.: PCT/JP2017/008093
§ 371 (c)(1),
(2) Date: Jul. 17, 2019

(87) PCT Pub. No.: WO2018/158878
PCT Pub. Date: Sep. 7, 2018

(65) Prior Publication Data
US 2019/0335275 A1    Oct. 31, 2019

(51) Int. Cl.
*H04R 3/04*    (2006.01)
*B60R 11/02*    (2006.01)
*G10K 15/00*    (2006.01)

(52) U.S. Cl.
CPC ............ *H04R 3/04* (2013.01); *B60R 11/0217* (2013.01); *B60R 11/0264* (2013.01); *G10K 15/00* (2013.01); *H04R 2499/13* (2013.01)

(58) Field of Classification Search
CPC ... H04R 3/04; H04R 2499/13; B60R 11/0217; B60R 11/0264; G10K 15/00
See application file for complete search history.

(56) References Cited

U.S. PATENT DOCUMENTS

| | | | |
|---|---|---|---|
| 9,559,650 B1 * | 1/2017 | Skovenborg | H03G 3/3005 |
| 2012/0288121 A1 * | 11/2012 | Matsui | H03G 3/3005 381/107 |

FOREIGN PATENT DOCUMENTS

| | | |
|---|---|---|
| JP | 4-151699 A | 5/1992 |
| JP | 5-103399 A | 4/1993 |
| JP | 11-46393 A | 2/1999 |
| JP | 2003-148997 A | 5/2003 |
| JP | 2010-109436 A | 5/2010 |
| JP | 2011-197418 A | 10/2011 |
| JP | 2016-72754 A | 5/2016 |

* cited by examiner

*Primary Examiner* — Andrew L Sniezek
(74) *Attorney, Agent, or Firm* — Birch, Stewart, Kolasch & Birch, LLP (57) ABSTRACT

Disclosed is a digital signal processing device including a digital filter unit for performing a filtering process on a signal inputted to the digital signal processing device on the basis of a filter coefficient set by a control device, a maximum allowable amplitude estimation unit for estimating a maximum allowable amplitude value allowable by the digital signal processing device in a system including the digital signal processing device, by using an impulse response of the digital filter unit, and a restart request unit for making a request of the control device for a restart of the digital signal processing device when the amplitude value of a signal to be outputted from the digital signal processing device is equal to or greater than the maximum allowable amplitude value or when the amplitude value exceeds the maximum allowable amplitude value.

11 Claims, 4 Drawing Sheets

DIGITAL SIGNAL PROCESSING DEVICE AND AUDIO DEVICE

TECHNICAL FIELD

The present invention relates to a digital signal processing device and a vehicle-mounted audio device having this digital signal processing device.

BACKGROUND ART

Conventionally, in various systems, a digital signal processing device such as a digital signal processor (DSP) is used. For example, in a vehicle-mounted audio system, a DSP that processes an audio signal is disposed. The DSP has a digital filter such as an infinite impulse response (IIR) filter. Various coefficients in the digital filter (generically referred to as "filter coefficients" hereafter) are adaptively set up in accordance with the state or the like of the system including the DSP.

There is a case in which when a DSP performs signal processing using a digital filter, the digital filter diverges or an abnormal state occurs in the DSP, and, as a result, there occurs a signal having a large amplitude exceeding a maximum allowable in a system including the DSP. Particularly, when a signal having a large amplitude occurs in a vehicle-mounted audio system, there is a possibility that a high-volume sound is outputted from a speaker and interferes with driving. Therefore, detection of the occurrence of a large amplitude and prompt suppression of a high-volume sound are required. As a typical method of detecting the occurrence of a large amplitude, there is a method including comparing the amplitude value of a signal with a preset threshold having a fixed value (for example, refer to Patent Literature 1).

CITATION LIST

Patent Literature

Patent Literature 1: Japanese Unexamined Patent Application Publication No. 2010-109436

SUMMARY OF INVENTION

Technical Problem

In a method of detecting the occurrence of a large amplitude by comparing the amplitude value of a signal with a threshold having a fixed value (referred to as a "conventional method" hereafter), it is necessary to set the threshold to a relatively high value from the viewpoint of making it possible to detect the occurrence of a large amplitude regardless of the state or the like of the system including the DSP, or from the viewpoint of avoiding erroneous detection. Therefore, a problem is that there is a case in which even though a large amplitude occurs, its amplitude value is less than the threshold, and, in this case, the occurrence of the large amplitude cannot be detected. In other words, a problem is that the conventional method has a low degree of detection accuracy.

The present invention is made in order to solve the above-mentioned problem, and it is therefore an object of the present invention to provide a digital signal processing device and an audio device that can detect the occurrence of a large amplitude with a high degree of accuracy.

Solution to Problem

According to the present invention, there is provided a digital signal processing device that freely communicates with a control device, the digital signal processing device including: a digital filter unit for performing a filtering process on a signal inputted to the digital signal processing device on the basis of a filter coefficient set by the control device; a maximum allowable amplitude estimation unit for estimating a maximum allowable amplitude value allowable by the digital signal processing device in a system including the digital signal processing device, by using an impulse response of the digital filter unit; and a restart request unit for making a request of the control device for a restart of the digital signal processing device when the amplitude value of a signal to be outputted from the digital signal processing device is equal to or greater than the maximum allowable amplitude value or when the amplitude value exceeds the maximum allowable amplitude value.

Advantageous Effects of Invention

According to the present invention, because the configuration as mentioned above is provided, a digital signal processing device and an audio device that can detect the occurrence of a large amplitude with a high degree of accuracy can be provided.

DESCRIPTION OF EMBODIMENTS

Hereafter, in order to explain this invention in greater detail, an embodiment of the present invention will be described with reference to the accompanying drawings.

Embodiment 1

Figure 1:
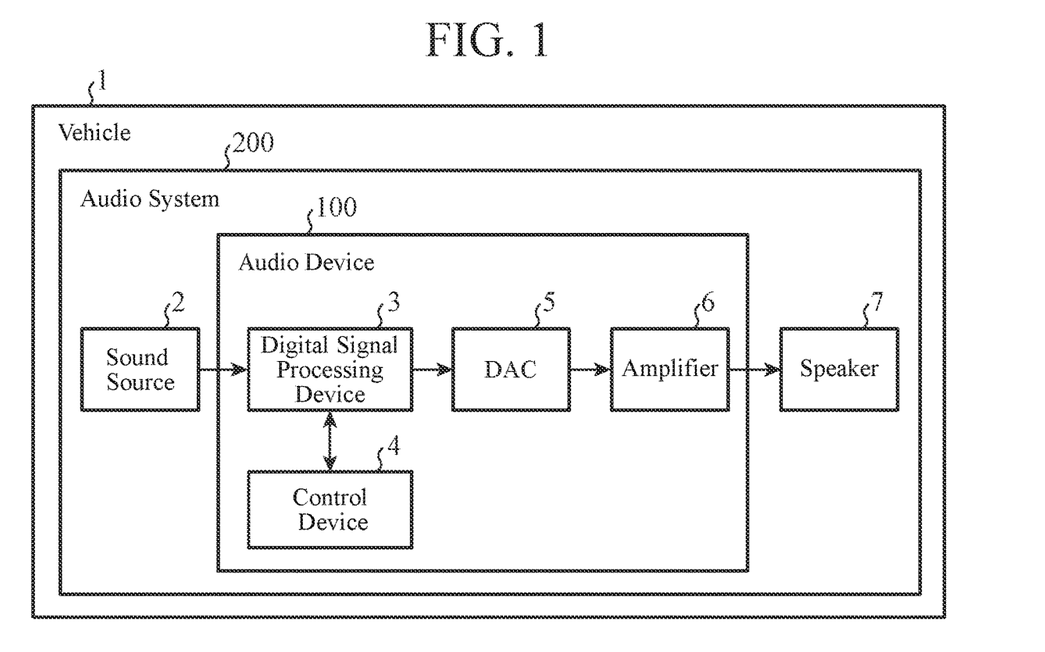
FIG. 1 is a system configuration diagram showing a main part of an audio system including an audio device according to Embodiment 1 of the present invention.

FIG. 1 is a system configuration diagram showing a main part of an audio system including an audio device according to Embodiment 1 of the present invention. Referring to FIG. 1, the audio device 100 of Embodiment 1 and the audio system 200 including this audio device 100 will be explained. The audio device 100 is a vehicle-mounted one, and is mounted in a vehicle 1.

In the figure, 2 denotes a sound source. The sound source 2 includes, for example, a Compact Disc (CD) player mounted in the dashboard of the vehicle 1, a portable music player carried into the vehicle 1, or the like. The sound source 2 outputs a digital signal corresponding to sound.

A digital signal processing device 3 receives input of the digital signal outputted by the sound source 2. The digital signal processing device 3 performs digital signal processing on the digital signal. The digital signal processing device 3 includes, for example, a DSP. The details of the digital signal processing device 3 will be mentioned later with reference to FIG. 2.

Here, the digital signal processing device 3 freely communicates with a control device 4. The control device 4 controls the operation of the digital signal processing device 3. The control device 4 includes, for example, a microcontroller. The details of the control device 4 will be mentioned later with reference to FIG. 2.

A digital analog converter (referred to as a "DAC" hereafter) 5 converts the digital signal outputted by the digital signal processing device 3 into an analog signal. The DAC 5 outputs the analog signal after conversion to an amplifier 6.

The amplifier 6 amplifies the analog signal outputted by the DAC 5. The amplifier 6 outputs the analog signal amplified thereby to a speaker 7.

The speaker 7 receives input of the analog signal outputted by the amplifier 6. The speaker 7 outputs sound corresponding to the analog signal. The speaker 7 includes, for example, two or more speakers mounted in the vehicle 1.

A main part of the audio device 100 includes the digital signal processing device 3, the control device 4, the DAC 5, and the amplifier 6. A main part of the audio system 200 includes the sound source 2, the audio device 100, and the speaker 7.

Figure 2:
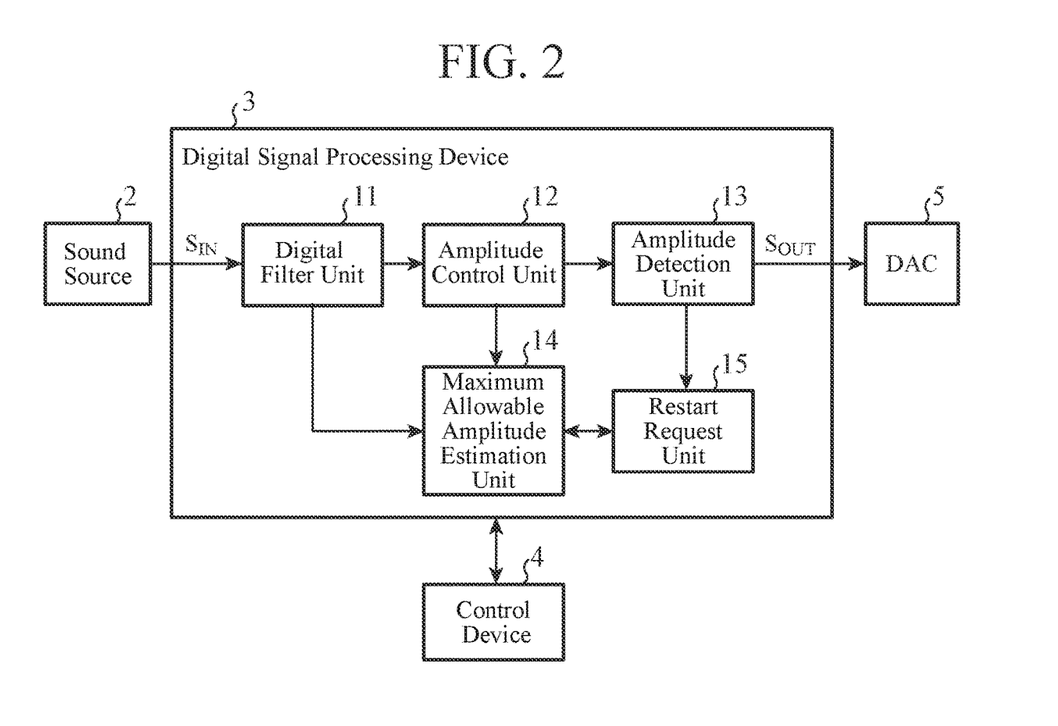
FIG. 2 is a functional block diagram showing a main part of a digital signal processing device according to Embodiment 1 of the present invention.

Next, the digital signal processing device 3 and the control device 4 will be explained with reference to FIG. 2.

A signal inputted to the digital signal processing device 3 passes through a digital filter unit 11, an amplitude control unit 12, and an amplitude detection unit 13 in order, and is outputted to outside the digital signal processing device 3. Hereafter, the signal $S_{IN}$ inputted to the digital signal processing device 3 is referred to as an "input signal." The signal $S_{OUT}$ to be outputted from the digital signal processing device 3 is referred to as an "output signal."

The digital filter unit 11 includes, for example, a single IIR filter or n IIR filters (n is an integer equal to or greater than 2) cascade-connected to each other. The digital filter unit 11 performs a filtering process, such as attenuation and amplification, on the input signal $S_{IN}$ on the basis of one or more filter coefficients. The filter coefficient is set by the control device 4.

The amplitude control unit 12 changes the amplitude of the signal outputted from the digital filter unit 11 by multiplying the signal by one or more predetermined coefficients. In Embodiment 1, because the digital signal processing device 3 is used for the audio system 200, this coefficient is one used for sound volume control (referred to as a "sound volume coefficient" hereafter). The sound volume coefficient is set by the control device 4.

The amplitude detection unit 13 detects the amplitude value of the signal outputted from the amplitude control unit 12, i.e., the amplitude value of the output signal $S_{OUT}$. The amplitude detection unit 13 outputs the amplitude value detected thereby to a restart request unit 15.

A maximum allowable amplitude estimation unit 14 acquires the filter coefficient currently set on the digital filter unit 11, and also acquires the sound volume coefficient currently set on the amplitude control unit 12. The maximum allowable amplitude estimation unit 14 calculates an impulse response of the digital filter unit 11 by using the filter coefficient acquired thereby. The maximum allowable amplitude estimation unit 14 estimates a maximum amplitude value allowable by the digital signal processing device 3 in the audio system 200, by using the impulse response calculated thereby and the sound volume coefficient acquired thereby. This maximum amplitude value is referred to as a "maximum allowable amplitude value" hereafter. A concrete method of estimating the maximum allowable amplitude value will be mentioned later. The maximum allowable amplitude estimation unit 14 outputs the maximum allowable amplitude value estimated thereby to the restart request unit 15.

The restart request unit 15 compares the amplitude value detected by the amplitude detection unit 13, i.e., the amplitude value of the output signal $S_{OUT}$, with the maximum allowable amplitude value estimated by the maximum allowable amplitude estimation unit 14. The restart request unit 15 makes a request of the control device 4 for a restart of the digital signal processing device 3 when the amplitude value of the output signal $S_{OUT}$ is equal to or greater than the maximum allowable amplitude value. The control device 4 restarts the digital signal processing device 3 in response to the request from the restart request unit 15.

Here, when the digital signal processing device 3 starts, the control device 4 sets the filter coefficient to a predetermined initial value and sets the sound volume coefficient to a predetermined initial value. When the digital signal processing device 3 starts, the maximum allowable amplitude estimation unit 14 calculates the impulse response by using the filter coefficient having the initial value and estimates the maximum allowable amplitude value by using the impulse response calculated thereby.

Further, the control device 4 updates the filter coefficient as appropriate in accordance with the state of the audio system 200 or the like while the digital signal processing device 3 operates. Concretely, for example, when a setting of an equalizer is changed through a user's operation, the control device 4 updates the filter coefficient in accordance with the change. When the filter coefficient has been updated, the maximum allowable amplitude estimation unit 14 calculates the impulse response by using the updated filter coefficient and estimates the maximum allowable amplitude value by using the impulse response calculated thereby.

A main part of the digital signal processing device 3 includes the digital filter unit 11, the amplitude control unit 12, the amplitude detection unit 13, the maximum allowable amplitude estimation unit 14, and the restart request unit 15.

Next, a method of estimating the maximum allowable amplitude value, the method being used by the maximum allowable amplitude estimation unit 14, will be explained. The maximum allowable amplitude estimation unit 14 estimates the maximum allowable amplitude value by using, for example, a first or second estimation method that will be mentioned below.

First Estimation Method

First, the maximum allowable amplitude estimation unit 14 acquires the filter coefficient currently set on the digital filter unit 11. The maximum allowable amplitude estimation unit 14 calculates the impulse response of the digital filter unit 11 by using the filter coefficient acquired thereby.

Concretely, for example, in the case in which the digital filter unit 11 is constituted by a single IIR filter, the maximum allowable amplitude estimation unit 14 calculates the impulse response of the IIR filter obtained when an impulse having an amplitude of "1" is inputted to the IIR filter.

Alternatively, for example, in the case in which the digital filter unit 11 is constituted by n IIR filters cascade-connected to each other, the maximum allowable amplitude estimation unit 14 first calculates the impulse response of a first IIR filter obtained when an impulse having an amplitude of "1" is inputted to the first IIR filter. The maximum allowable amplitude estimation unit 14 then calculates the impulse response of a second IIR filter obtained when the impulse response of the first IIR filter is inputted to the second IIR filter. After that, the maximum allowable amplitude estimation unit 14 sequentially performs the same calculation. Finally, the maximum allowable amplitude estimation unit 14 calculates the impulse response of an n-th IIR filter obtained when the impulse response of an (n−1)-th IIR filter is inputted to the n-th IIR filter.

Then, the maximum allowable amplitude estimation unit 14 calculates the absolute values of respective samples in the impulse response calculated thereby. Then, by integrating these absolute values, the maximum allowable amplitude estimation unit 14 estimates a maximum amplitude value allowable by the digital filter unit 11 in the audio system 200. This maximum amplitude value is referred to as a "filter maximum allowable amplitude value" hereafter. More concretely, by calculating the sum total of these absolute values, the maximum allowable amplitude estimation unit 14 estimates the filter maximum allowable amplitude value. The filter maximum allowable amplitude value estimated using the first estimation method includes a margin of the order of 6 dB with respect to an actual filter maximum allowable amplitude value.

The value acquired through the above arithmetic operation originally indicates a maximum amplitude value that the signal outputted from the digital filter unit 11 is assumed to have under the condition of the filter coefficient currently set. However, the maximum allowable amplitude estimation unit 14 uses the fact that this value can be assumed to be a value acquired by adding a margin of the order of several decibels to the filter maximum allowable amplitude value, thereby estimating the filter maximum allowable amplitude value.

Usually, in order to calculate a correct filter maximum allowable amplitude value, a fast Fourier transform (FFT) or convolution is needed. In contrast with this, the first estimation method can eliminate the need for an FFT and convolution in the estimation of the filter maximum allowable amplitude value. As a result, the amount of the arithmetic operation can be reduced.

Then, the maximum allowable amplitude estimation unit 14 acquires the sound volume coefficient currently set on the amplitude control unit 12. The maximum allowable amplitude estimation unit 14 acquires the maximum amplitude value allowable by the digital signal processing device 3 in the audio system 200, i.e., the maximum allowable amplitude value by performing multiplication of the filter maximum allowable amplitude value estimated thereby and the sound volume coefficient acquired thereby. In this way, the maximum allowable amplitude value is estimated.

Second Estimation Method

First, the maximum allowable amplitude estimation unit 14 acquires the filter coefficient currently set on the digital filter unit 11. The maximum allowable amplitude estimation unit 14 calculates the impulse response of the digital filter unit 11 by using the filter coefficient acquired thereby. Because a method of calculating the impulse response is the same as that of the first estimation method, an explanation of the calculating method will be omitted hereafter.

Then, the maximum allowable amplitude estimation unit 14 performs an FFT on the impulse response calculated thereby. The FFT length at this time is set to, for example, the same value as the impulse length. A processing result that is a complex number is acquired by the FFT. Then, the maximum allowable amplitude estimation unit 14 acquires the absolute values of points in this processing result.

Then, the maximum allowable amplitude estimation unit 14 searches through the absolute values acquired thereby for a maximum within a range having a length of one half of the impulse length. Then, the maximum allowable amplitude estimation unit 14 calculates a value that is the result of addition of a margin of the order of 3 to 6 dB to the maximum found. The maximum allowable amplitude estimation unit 14 estimates that this value is the filter maximum allowable amplitude value.

Then, the maximum allowable amplitude estimation unit 14 acquires the sound volume coefficient currently set on the amplitude control unit 12. The maximum allowable amplitude estimation unit 14 acquires the maximum amplitude value allowable by the digital signal processing device 3 in the audio system 200, i.e., the maximum allowable amplitude value by performing multiplication of the filter maximum allowable amplitude value estimated thereby and the sound volume coefficient acquired thereby. In this way, the maximum allowable amplitude value is estimated.

Next, the operation of the digital signal processing device 3 will be explained with reference to flowcharts of FIGS. 3 and 4. When the digital signal processing device 3 starts, the control device 4 sets the filter coefficient to its initial value and also sets the sound volume coefficient to its initial value. Further, the digital signal processing device 3 starts a process of step ST1.

First, in step ST1, the digital filter unit 11 performs the filtering process on the input signal $S_{IN}$ on the basis of the filter coefficient set by the control device 4. Then, in step ST2, the amplitude control unit 12 changes the amplitude of the signal outputted from the digital filter unit 11 by multiplying the signal by the sound volume coefficient. Then, in step ST3, the amplitude detection unit 13 detects the amplitude value of the signal outputted from the amplitude control unit 12, i.e., the amplitude value of the output signal $S_{OUT}$. The amplitude detection unit 13 outputs the amplitude value detected thereby to the restart request unit 15. Then, the processing by the digital signal processing device 3 returns to step ST1.

Figure 3:
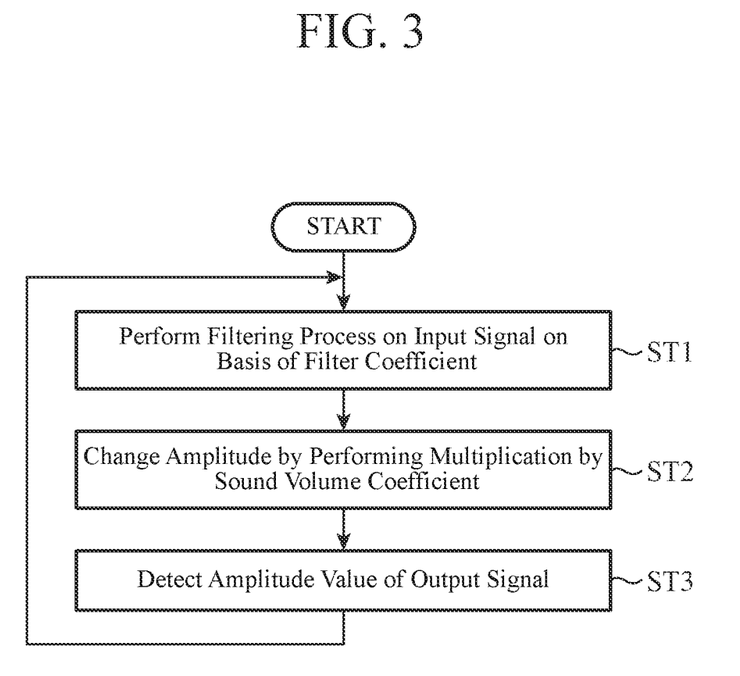
FIG. 3 is a flowchart showing an operation of the digital signal processing device according to Embodiment 1 of the present invention.

More specifically, during the operation of the digital signal processing device 3, the processes of steps ST1 to ST3 shown in FIG. 3 are performed repeatedly. In the course of these repetitive processes, the control device 4 updates the filter coefficient as appropriate. The digital filter unit 11, instep ST1 of processing performed for the second or subsequent time, performs the filtering process on the basis of the newest filter coefficient set by the control device 4.

Figure 4:
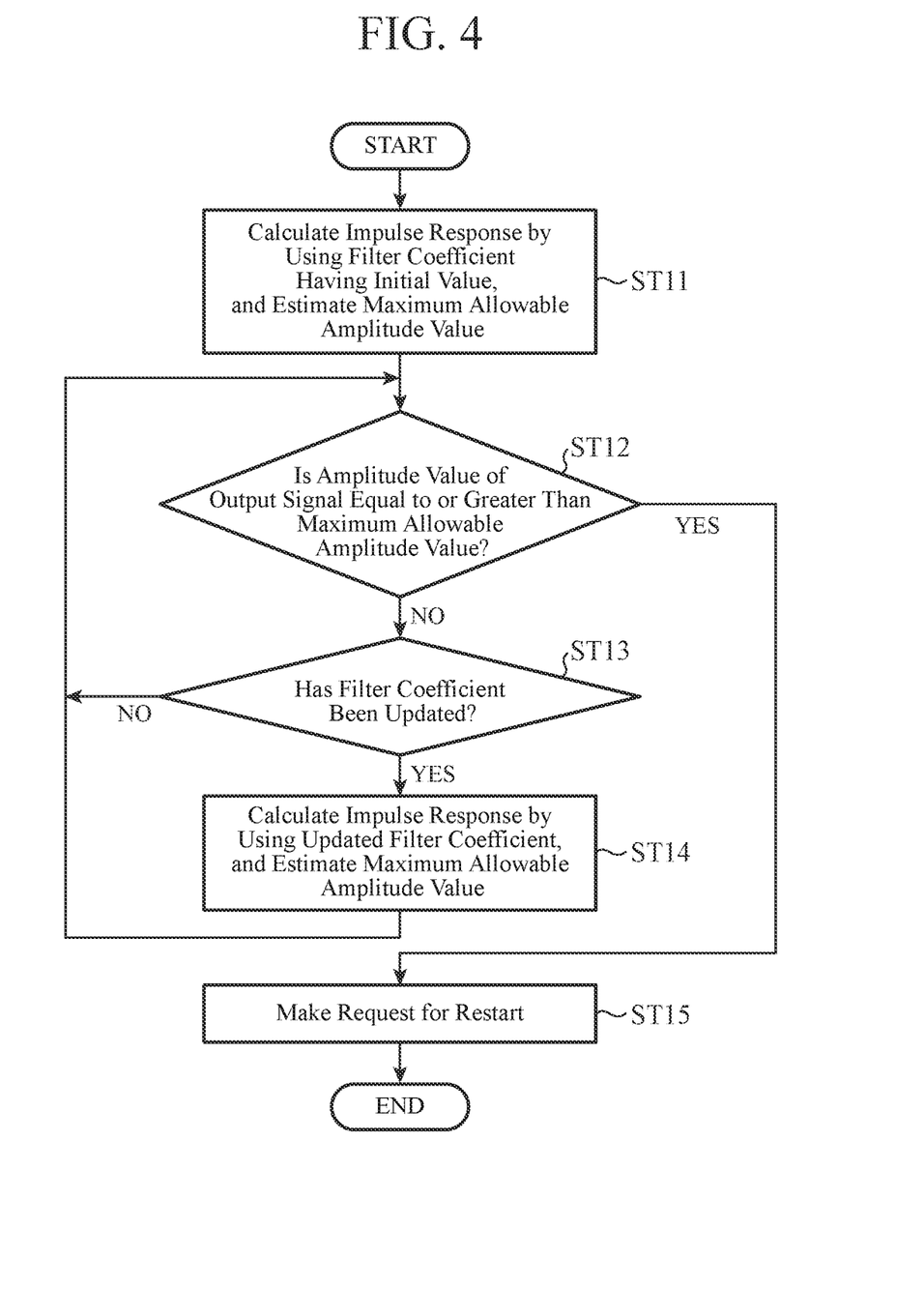
FIG. 4 is a flowchart showing another operation of the digital signal processing device according to Embodiment 1 of the present invention.

Further, in the background behind the above-mentioned repetitive processes, processes of steps ST11 to ST15 shown in FIG. 4 are performed. More specifically, when the digital signal processing device 3 starts, the digital signal processing device 3 starts the process of step ST11.

First, in step ST11, the maximum allowable amplitude estimation unit 14 acquires the filter coefficient currently set on the digital filter unit 11, i.e., the filter coefficient having the initial value. Further, the maximum allowable amplitude estimation unit 14 acquires the sound volume coefficient currently set on the amplitude control unit 12, i.e., the sound volume coefficient having the initial value. The maximum allowable amplitude estimation unit 14 calculates the impulse response of the digital filter unit 11 by using the filter coefficient acquired thereby. The maximum allowable amplitude estimation unit 14 estimates the maximum allowable amplitude value in accordance with the first or second estimation method, by using the impulse response calculated thereby and the sound volume coefficient acquired thereby. The maximum allowable amplitude estimation unit 14 outputs the maximum allowable amplitude value estimated thereby to the restart request unit 15.

Then, in step ST12, the restart request unit 15 compares the amplitude value inputted, in latest step ST3, from the amplitude detection unit 13, i.e., the amplitude value of the output signal $S_{OUT}$, with the maximum allowable amplitude value inputted, in step ST11, from the maximum allowable amplitude estimation unit 14.

When it is determined that the amplitude value of the output signal $S_{OUT}$ is less than the maximum allowable amplitude value ("NO" in step ST12), the restart request unit 15 instructs the maximum allowable amplitude estimation unit 14 to determine whether the filter coefficient has been updated. Then, in step ST13, the maximum allowable amplitude estimation unit 14 determines whether the filter coefficient has been updated.

More specifically, in step ST13, the maximum allowable amplitude estimation unit 14 acquires the filter coefficient currently set on the digital filter unit 11. The maximum allowable amplitude estimation unit 14 determines whether the filter coefficient has been updated by comparing the filter coefficient acquired thereby last time with the filter coefficient acquired thereby this time. In first-time step ST13, the "filter coefficient acquired last time" is the filter coefficient acquired in step ST11. In second or subsequent-time step ST13, the "filter coefficient acquired last time" is the filter coefficient acquired in last-time step ST13.

When the filter coefficient has been updated ("YES" in step ST13), the maximum allowable amplitude estimation unit 14, in step ST14, calculates the impulse response of the digital filter unit 11 by using the filter coefficient acquired in step ST13, i.e., the updated filter coefficient. The maximum allowable amplitude estimation unit 14 estimates the maximum allowable amplitude value in accordance with the first or second estimation method, by using the impulse response calculated thereby and the sound volume coefficient acquired thereby in step ST11. The maximum allowable amplitude estimation unit 14 outputs the maximum allowable amplitude value estimated thereby to the restart request unit 15.

Then, the processing by the digital signal processing device 3 returns to step ST12. In step ST12, the restart request unit 15 compares the amplitude value inputted, in latest step ST3, from the amplitude detection unit 13, i.e., the amplitude value of the output signal $S_{OUT}$, with the maximum allowable amplitude value inputted, in step ST14, from the maximum allowable amplitude estimation unit 14.

When the filter coefficient has not been updated ("NO" in step ST13), the process of step ST14 is skipped. In this case, in step ST12, the restart request unit 15 compares the amplitude value inputted, in latest step ST3, from the amplitude detection unit 13, i.e., the amplitude value of the output signal $S_{OUT}$, with the newest maximum allowable amplitude value inputted from the maximum allowable amplitude estimation unit 14. Here, when the number of times that step ST14 is performed after the digital signal processing device 3 starts is zero, the "newest maximum allowable amplitude value" is the maximum allowable amplitude value inputted, in step ST11, from the maximum allowable amplitude estimation unit 14. In contrast, when the number of times that step ST14 is performed after the digital signal processing device 3 starts is one or more, the "newest maximum allowable amplitude value" is the maximum allowable amplitude value inputted, in latest step ST14, from the maximum allowable amplitude estimation unit 14.

When it is determined that the amplitude value of the output signal $S_{OUT}$ is equal to or greater than the maximum allowable amplitude value ("YES" in step ST12), the restart request unit 15, in step ST15, makes a request of the control device 4 for a restart of the digital signal processing device 3. The control device 4 restarts the digital signal processing device 3 in response to the request from the restart request unit 15. As a result, the processing by the digital signal processing device 3 is temporarily ended.

Figure 5:
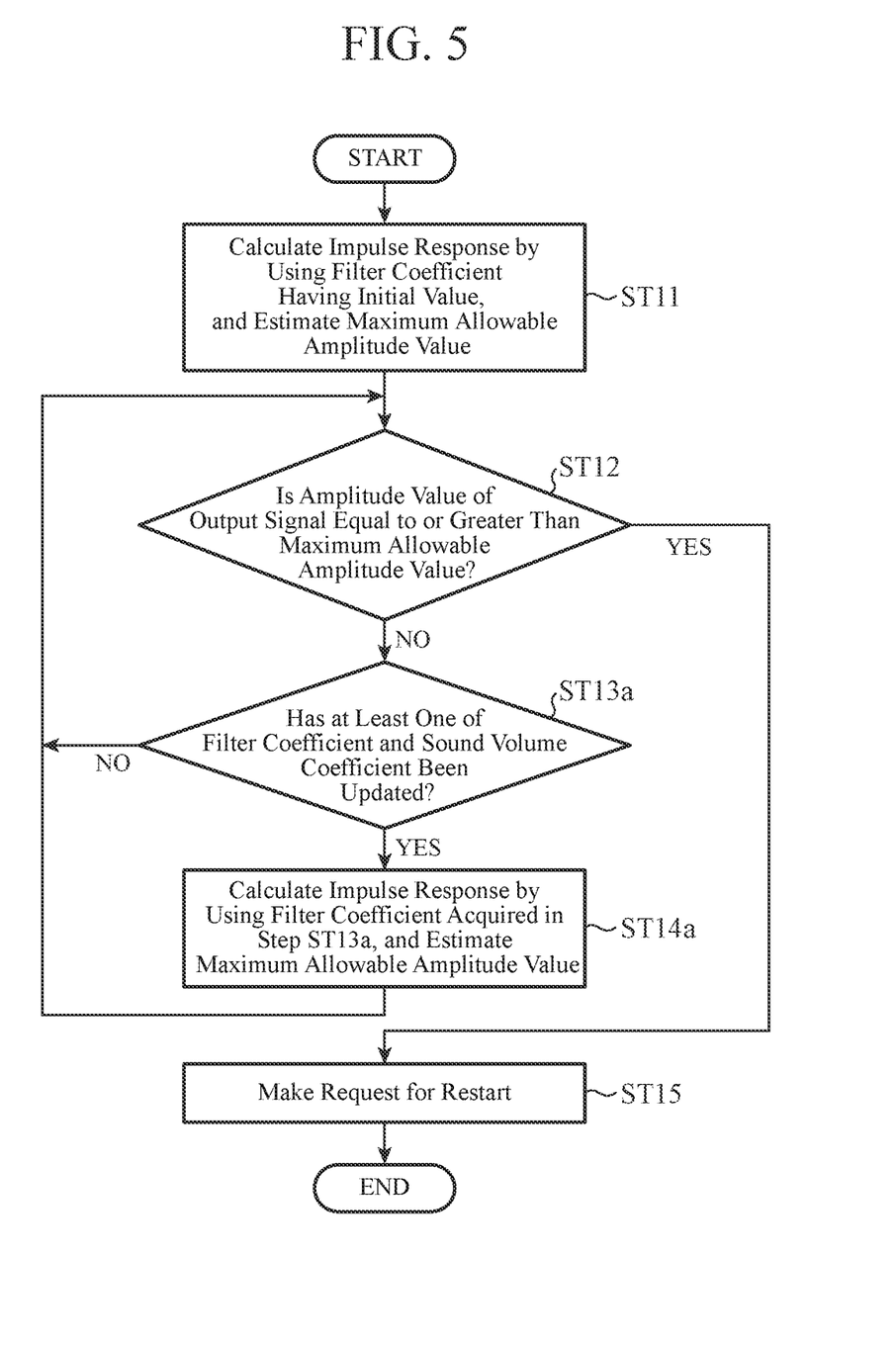
FIG. 5 is a flowchart showing another operation of the digital signal processing device according to Embodiment 1 of the present invention.

In the course of the repetitive processes in steps ST1 to ST3, the control device 4 can update the sound volume coefficient as appropriate in accordance with the state or the like of the audio system 200. Concretely, for example, when the setting of the sound volume is changed through the user's operation, the control device 4 can update the sound volume coefficient in accordance with the change. A flowchart in this case is shown in FIG. 5. In FIG. 5, the same steps as those of the flowchart shown in FIG. 4 are denoted by the same reference characters, and an explanation of the steps will be omitted hereafter.

When it is determined that the amplitude value of the output signal $S_{OUT}$ is less than the maximum allowable amplitude value ("NO" in step ST12), the restart request unit 15 instructs the maximum allowable amplitude estimation unit 14 to determine whether at least one of the filter coefficient and the sound volume coefficient has been updated. Then, in step ST13a, the maximum allowable amplitude estimation unit 14 determines whether at least one of the filter coefficient and the sound volume coefficient has been updated.

More specifically, in step ST13a, the maximum allowable amplitude estimation unit 14 acquires the filter coefficient currently set on the digital filter unit 11 and also acquires the sound volume coefficient currently set on the amplitude control unit 12. The maximum allowable amplitude estimation unit 14 determines whether the filter coefficient has been updated by comparing the filter coefficient acquired thereby last time with the filter coefficient acquired thereby this time. Similarly, the maximum allowable amplitude estimation unit 14 determines whether the sound volume coefficient has been updated by comparing the sound volume coefficient acquired thereby last time with the sound volume coefficient acquired thereby this time.

When at least one of the filter coefficient and the sound volume coefficient has been updated ("YES" in step ST13a), the maximum allowable amplitude estimation unit 14 performs a process of step ST14a. In contrast, when the filter coefficient has not been updated and the sound volume coefficient has not been updated ("NO" in step ST13a), the process of step ST14a is skipped.

In step ST14a, the maximum allowable amplitude estimation unit 14 calculates the impulse response of the digital filter unit 11 by using the filter coefficient acquired thereby in step ST13a. The maximum allowable amplitude estimation unit 14 estimates the maximum allowable amplitude value in accordance with the first or second estimation method, by using the impulse response calculated thereby and the sound volume coefficient acquired thereby in step ST13a. The maximum allowable amplitude estimation unit 14 outputs the maximum allowable amplitude value estimated thereby to the restart request unit 15.

In step ST12, the restart request unit 15 can determine "YES" when the amplitude value of the output signal $S_{OUT}$ exceeds the maximum allowable amplitude value, and determine "NO" when the amplitude value of the output signal $S_{OUT}$ is equal to or less than the maximum allowable amplitude value.

Further, the digital signal processing device 3 can be used for, as well as the vehicle-mounted audio device 100, audio devices other than vehicle-mounted audio devices. Further, the digital signal processing device 3 can also be used for devices other than audio devices. More specifically, the digital signal processing device 3 can be used for any device which needs digital signal processing.

Further, the digital signal processing device 3 can be used for, as well as the vehicle-mounted audio system 200, audio systems other than vehicle-mounted audio systems. Further, the digital signal processing device 3 can also be used for systems other than audio systems. More specifically, the digital signal processing device 3 can be used for any system which needs digital signal processing.

Further, the digital signal processing device 3 can be any device that freely communicates with the control device 4 and can perform digital signal processing, and is not limited to a DSP. The control device 4 can be any device that can perform setting of the filter coefficient and the sound volume coefficient and a restart of the digital signal processing device 3, and is not limited to a microcontroller.

Further, the digital filter unit 11 can be any unit that includes a digital filter, and is not limited to an IIR filter. The digital filter unit 11 can be one that uses, for example, a finite impulse response (FIR) filter or an adaptive filter.

As mentioned above, the digital signal processing device 3 of Embodiment 1 freely communicates with the control device 4, and includes: the digital filter unit 11 for performing a filtering process on a signal (input signal $S_{IN}$) inputted to the digital signal processing device 3 on the basis of a filter coefficient set by the control device 4; the maximum allowable amplitude estimation unit 14 for estimating a maximum allowable amplitude value allowable by the digital signal processing device 3 in the system (audio system 200) including the digital signal processing device 3, by using an impulse response of the digital filter unit 11; and the restart request unit 15 for making a request of the control device 4 for a restart of the digital signal processing device 3 when the amplitude value of a signal (output signal $S_{OUT}$) to be outputted from the digital signal processing device 3 is equal to or greater than the maximum allowable amplitude value or when the amplitude value exceeds the maximum allowable amplitude value. By estimating the maximum allowable amplitude value by using the impulse response of the digital filter unit 11, the maximum allowable amplitude value can be estimated adaptively for the filter coefficient. By comparing the maximum allowable amplitude value estimated in this way with the amplitude value of the output signal $S_{OUT}$, the occurrence of a large amplitude can be detected with an accuracy higher than that of a conventional method using a threshold having a fixed value. Further, in the case in which the digital signal processing device 3 is used for the audio system 200, a high-volume sound can be promptly suppressed through a restart of the digital signal processing device 3.

Further, the maximum allowable amplitude estimation unit acquires absolute values of the impulse response, and estimates the maximum allowable amplitude value by integrating the absolute values. As a result, the maximum allowable amplitude value can be estimated using the first estimation method. Further, the need for an FFT and convolution in the estimation of the filter maximum allowable amplitude value can be eliminated, and thus the amount of the arithmetic operation can be reduced.

Further, the maximum allowable amplitude estimation unit 14 estimates the maximum allowable amplitude value by performing an FFT on the impulse response. As a result, the maximum allowable amplitude value can be estimated using the second estimation method.

Further, the digital signal processing device 3 includes the amplitude control unit 12 for changing the amplitude of a signal outputted from the digital filter unit 11 on the basis of a coefficient (sound volume coefficient) set by the control device 4, and the maximum allowable amplitude estimation unit 14 estimates the maximum allowable amplitude value by using the impulse response and the coefficient (sound volume coefficient). By estimating the maximum allowable amplitude value by using the sound volume coefficient, the maximum allowable amplitude value can be estimated adaptively for the sound volume coefficient. As a result, the occurrence of a large amplitude can be detected with a much higher degree of accuracy.

Further, when the digital signal processing device 3 starts, the maximum allowable amplitude estimation unit 14 calculates the impulse response by using the filter coefficient having an initial value, and estimates the maximum allowable amplitude value by using the impulse response calculated thereby. As a result, when the digital signal processing device 3 starts, the maximum allowable amplitude value can be estimated.

Further, when the filter coefficient has been updated by the control device 4, the maximum allowable amplitude estimation unit 14 calculates the impulse response by using the updated filter coefficient, and estimates the maximum allowable amplitude value by using the impulse response calculated thereby. As a result, when the control device 4 updates the filter coefficient, the maximum allowable amplitude value can be estimated.

Further, the audio device 100 of Embodiment 1 includes the control device 4 and the digital signal processing device 3 that freely communicates with the control device 4, and the digital signal processing device 3 includes: the digital filter unit 11 for performing a filtering process on a signal (input signal $S_{IN}$) inputted to the digital signal processing device 3 on the basis of a filter coefficient set by the control device 4; the maximum allowable amplitude estimation unit 14 for estimating a maximum allowable amplitude value allowable by the digital signal processing device 3 in the audio system 200 including the audio device 100, by using an impulse response of the digital filter unit 11; and the restart request unit 15 for making a request of the control device 4 for a restart of the digital signal processing device 3 when the amplitude value of a signal (output signal $S_{OUT}$) to be outputted from the digital signal processing device 3 is equal to or greater than the maximum allowable amplitude value or when the amplitude value exceeds the maximum allowable amplitude value. As a result, the advantages that are the same as those provided by the above-mentioned digital signal processing device 3 can be provided.

It is to be understood that various changes can be made in any component according to the embodiment, and any component according to the embodiment can be omitted within the scope of the invention.

INDUSTRIAL APPLICABILITY

The digital signal processing device of the present invention can be used for, for example, a vehicle-mounted audio system.

REFERENCE SIGNS LIST

1 vehicle, 2 sound source, 3 digital signal processing device, 4 control device, 5 digital analog converter (DAC), 6 amplifier, 7 speaker, 11 digital filter unit, 12 amplitude control unit, 13 amplitude detection unit, 14 maximum allowable amplitude estimation unit, 15 restart request unit, 100 audio device, and 200 audio system.

The invention claimed is:

1. A digital signal processing device that freely communicates with a control device, the digital signal processing device comprising:
　a digital filter unit for performing a filtering process on a signal inputted to the digital signal processing device on a basis of a filter coefficient set by the control device;
　a maximum allowable amplitude estimation unit for estimating a maximum allowable amplitude value allowable by the digital signal processing device in a system including the digital signal processing device, by using an impulse response of the digital filter unit; and
　a restart request unit for making a request of the control device for a restart of the digital signal processing device when an amplitude value of a signal to be outputted from the digital signal processing device is equal to or greater than the maximum allowable amplitude value or when the amplitude value exceeds the maximum allowable amplitude value.

2. The digital signal processing device according to claim 1, wherein the maximum allowable amplitude estimation unit acquires absolute values of the impulse response, and estimates the maximum allowable amplitude value by integrating the absolute values.

3. The digital signal processing device according to claim 1, wherein the maximum allowable amplitude estimation unit estimates the maximum allowable amplitude value by performing a fast Fourier transform on the impulse response.

4. The digital signal processing device according to claim 1, wherein the digital filter unit includes an infinite impulse response filter.

5. The digital signal processing device according to claim 1, comprising an amplitude control unit for changing an amplitude of a signal outputted from the digital filter unit on a basis of a coefficient set by the control device, wherein the maximum allowable amplitude estimation unit estimates the maximum allowable amplitude value by using the impulse response and the coefficient.

6. The digital signal processing device according to claim 1, wherein when the digital signal processing device starts, the maximum allowable amplitude estimation unit calculates the impulse response by using the filter coefficient having an initial value, and estimates the maximum allowable amplitude value by using the impulse response calculated.

7. The digital signal processing device according to claim 1, wherein when the filter coefficient has been updated by the control device, the maximum allowable amplitude estimation unit calculates the impulse response by using the updated filter coefficient, and estimates the maximum allowable amplitude value by using the impulse response calculated.

8. The digital signal processing device according to claim 1, wherein the digital signal processing device includes a digital signal processor.

9. The digital signal processing device according to claim 1, wherein the control device includes a microcontroller.

10. The digital signal processing device according to claim 1, wherein the system is a vehicle-mounted audio system.

11. A vehicle-mounted audio device including a control device and a digital signal processing device that freely communicates with the control device, the digital signal processing device comprising:
　a digital filter unit for performing a filtering process on a signal inputted to the digital signal processing device on a basis of a filter coefficient set by the control device;
　a maximum allowable amplitude estimation unit for estimating a maximum allowable amplitude value allowable by the digital signal processing device in an audio system including the audio device, by using an impulse response of the digital filter unit; and
　a restart request unit for making a request of the control device for a restart of the digital signal processing device when an amplitude value of a signal to be outputted from the digital signal processing device is equal to or greater than the maximum allowable amplitude value or when the amplitude value exceeds the maximum allowable amplitude value.

* * * * *